US012265610B2

(12) United States Patent
Ellam et al.

(10) Patent No.: US 12,265,610 B2
(45) Date of Patent: Apr. 1, 2025

(54) TELEMETRY DATA

(71) Applicant: Hewlett-Packard Development Company, L.P., Spring, TX (US)

(72) Inventors: Daniel Cameron Ellam, Bristol (GB); Adrian John Baldwin, Bristol (GB); Nelson Liang An Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 322 days.

(21) Appl. No.: 17/761,637

(22) PCT Filed: Oct. 21, 2019

(86) PCT No.: PCT/US2019/057199
§ 371 (c)(1),
(2) Date: Mar. 18, 2022

(87) PCT Pub. No.: WO2021/080554
PCT Pub. Date: Apr. 29, 2021

(65) Prior Publication Data
US 2022/0382858 A1    Dec. 1, 2022

(51) Int. Cl.
*H04L 41/5061* (2022.01)
*G06F 21/55* (2013.01)

(52) U.S. Cl.
CPC ........ *G06F 21/552* (2013.01); *H04L 41/5061* (2013.01)

(58) Field of Classification Search
None
See application file for complete search history.

(56) References Cited

U.S. PATENT DOCUMENTS

| | | | |
|---|---|---|---|
| 9,654,485 B1 | 5/2017 | Neumann | |
| 9,672,497 B1 | 6/2017 | Lewis et al. | |
| 10,855,561 B2* | 12/2020 | Monahan | H04L 41/5051 |
| 11,223,540 B1* | 1/2022 | Lilley | H04L 67/306 |
| 2002/0087290 A1 | 7/2002 | Wegerich et al. | |
| 2011/0004419 A1 | 1/2011 | Ue et al. | |
| 2012/0304007 A1 | 11/2012 | Hanks et al. | |
| 2013/0262082 A1 | 10/2013 | Mckeeman et al. | |
| 2014/0006861 A1 | 1/2014 | Jain et al. | |
| 2016/0204992 A1 | 7/2016 | Wu et al. | |
| 2017/0161335 A1* | 6/2017 | Akula | G06F 16/9024 |
| 2017/0346795 A1* | 11/2017 | Gong | H04L 63/045 |
| 2018/0239752 A1 | 8/2018 | Bhattacharya | |
| 2018/0247218 A1* | 8/2018 | Fiumara | G06N 5/022 |
| 2018/0308069 A1 | 10/2018 | Starks | |
| 2019/0004890 A1 | 1/2019 | Venkataraman et al. | |
| 2019/0281172 A1 | 9/2019 | Baba | |
| 2020/0050896 A1* | 2/2020 | Jayaraman | G06F 18/211 |

FOREIGN PATENT DOCUMENTS

WO    WO-2016168733 A1    10/2016

* cited by examiner

*Primary Examiner* — Angela Nguyen
(74) *Attorney, Agent, or Firm* — Knobbe, Martens, Olson & Bear, LLP (57) ABSTRACT

An apparatus and method is described comprising: classifying service ticket data relating to a service request into a service topic, wherein the service ticket data is obtained from the service request relating to a device; determining, for the service request, an extent to which the service topic matches a telemetry data class, wherein the telemetry data class relates to activities at the device; and providing an output according to said determination.

14 Claims, 8 Drawing Sheets

TELEMETRY DATA

BACKGROUND

Organizations may use service tickets to track issues with equipment. For example, a ticket may be created when an issue is reported. Actions may be performed for resolving the issue. There remains a need for further improvement in this field.

BRIEF DESCRIPTION OF DRAWINGS

Examples will now be described, by way of example only, with reference to the following schematic drawings, in which.

DETAILED DESCRIPTION

In the description and drawings, like reference numerals refer to like elements throughout.

Figure 1:
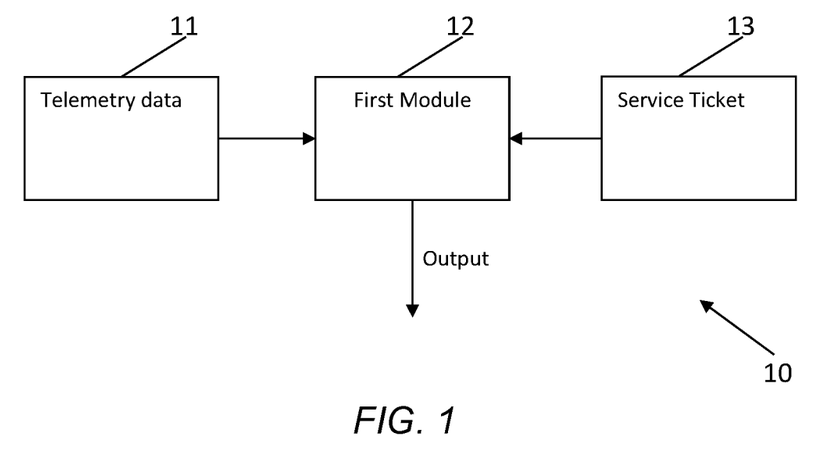
FIGS. 1 to 3 are block diagrams of systems in accordance with examples.

FIG. 1 is a block diagram of a system, indicated generally by the reference numeral 10, in accordance with an example. System 10 comprises a first module 12 that may be configured to perform operations as described in further detail below. The first module 12 may receive telemetry data 11 and service ticket data 13. The telemetry data 11 may comprise information relating to an activity (or activities) performed at a device. The telemetry data 11 may be received from the device (e.g. a printer) and may indicate the activity taking place at the device at a given time period. The service ticket data 13 may be related to a service request relating to the device. The first module 12 may use the telemetry data 11 and the service ticket data 13 for providing an output. In an example, the telemetry data 11 may relate to activities performed at a plurality of devices, and may be received from the respective plurality of devices. The service ticket data may also relate to a plurality of service requests.

By way of example, the activity performed at the device (e.g. printers, scanners, and/or similar devices) may be performed in response to an issue reported through the service request. However, if an activity performed is not in response to any issue, or the an activity is not the appropriate response to any of the issues reported through service requests, there may be an indication of suspicious activity (e.g. activities performed by a malicious software, or someone performing activities that are not required to be performed or are not recommended to be performed).

As such, the output provided by the first module 12 may be an indication of whether the activity is suspicious or not. For example, the output may comprise information regarding the likelihood that the activity was performed in response to a service request. The output may, for example, comprise an alert level.

Figure 2:
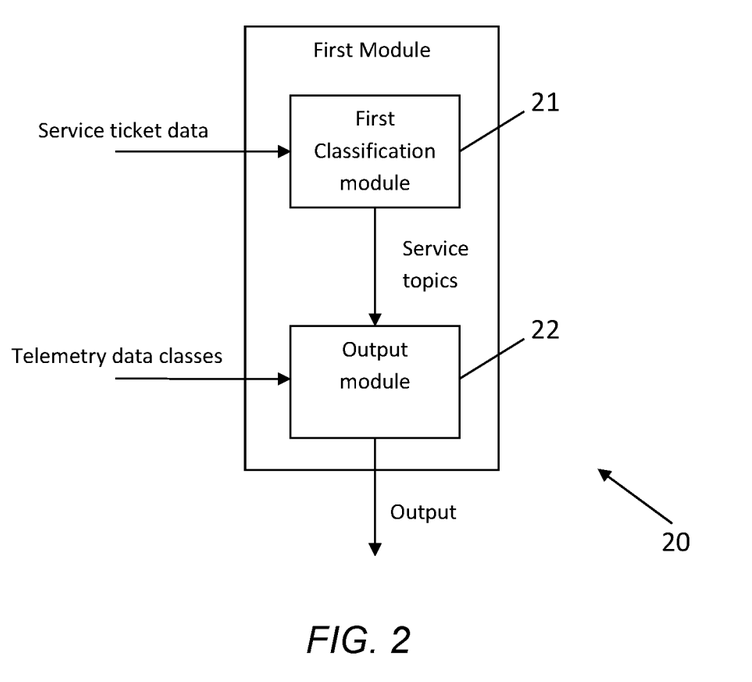

FIG. 2 is a block diagram of a system, indicated generally by the reference numeral 20. System 20 is an example implementation of the first module 12. As shown in FIG. 2, the system 20 comprises a first classification module 21 and an output module 22. The system 20 may receive, as inputs, service ticket data (e.g. the service ticket data 13 discussed above), which service ticket data may be received at the first classification module 21. Classification of the service ticket data (e.g. service topics) may be provided as inputs to the output module 22. The system 20 may further receive, as inputs, telemetry data classes (e.g. based on the telemetry data 11 discussed above), which telemetry data classes may be obtained at the output module 22.

Figure 3:
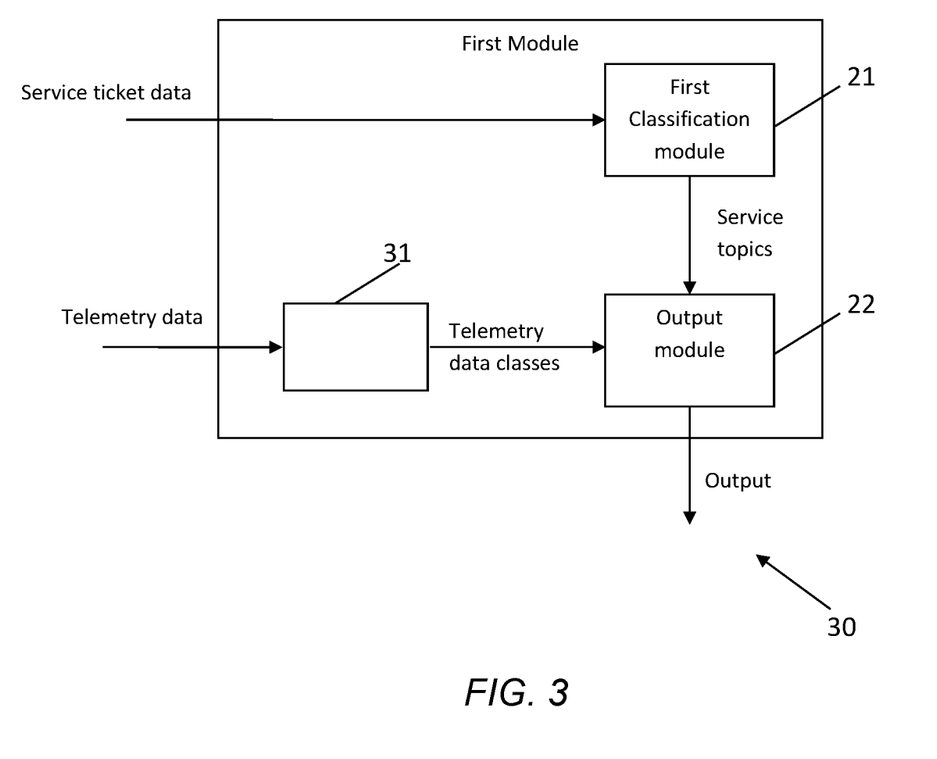

FIG. 3 is a block diagram of a system, indicated generally by the reference numeral 30, in accordance with an example. The system 30, which is an example implementation of the first module 12, comprises the first classification module 21 and the output module 22, as described in FIG. 2. The system 30 further comprises a telemetry data classification module 31, such that the telemetry data classes may be generated at the telemetry data classification module 31 based on input telemetry data (discussed in detail with reference to FIG. 5). The telemetry data (such as telemetry data 11) may be provided as inputs to the system 30, such that the telemetry data classification module 31 may generate telemetry data classes, and the generated telemetry data classes may be provided as inputs to the output module 22. The output module 22 may provide outputs based on the service topics and the telemetry data classes.

A module, such as the first module 12, the first module 20, the first classification module 21, the output module 22, and/or the telemetry data classification module 31 may be implemented in software, hardware, application logic or a combination of software, hardware and application logic.

In an example, the telemetry data may be generated at the device (such as instrumentation of systems or subsystems) at which the activities or events occur, such that the telemetry data may relate to a variety of device components and actions. For example, the telemetry data may relate to security notifications and alerts, changes in device configuration, device parameters, and/or device settings, software installations, software reinstallations, software uninstallations, firmware upgrades, firmware downgrades, physical part defects or replacement, and/or interactions (e.g. human interactions) with the devices (e.g. print jobs, scan jobs, user authentication, logins, logouts, etc.). The telemetry data may also comprise metadata such as time stamps, device identification (e.g. serial number, IP address or hostname) and/or username of a user performing the activity.

Figure 4:
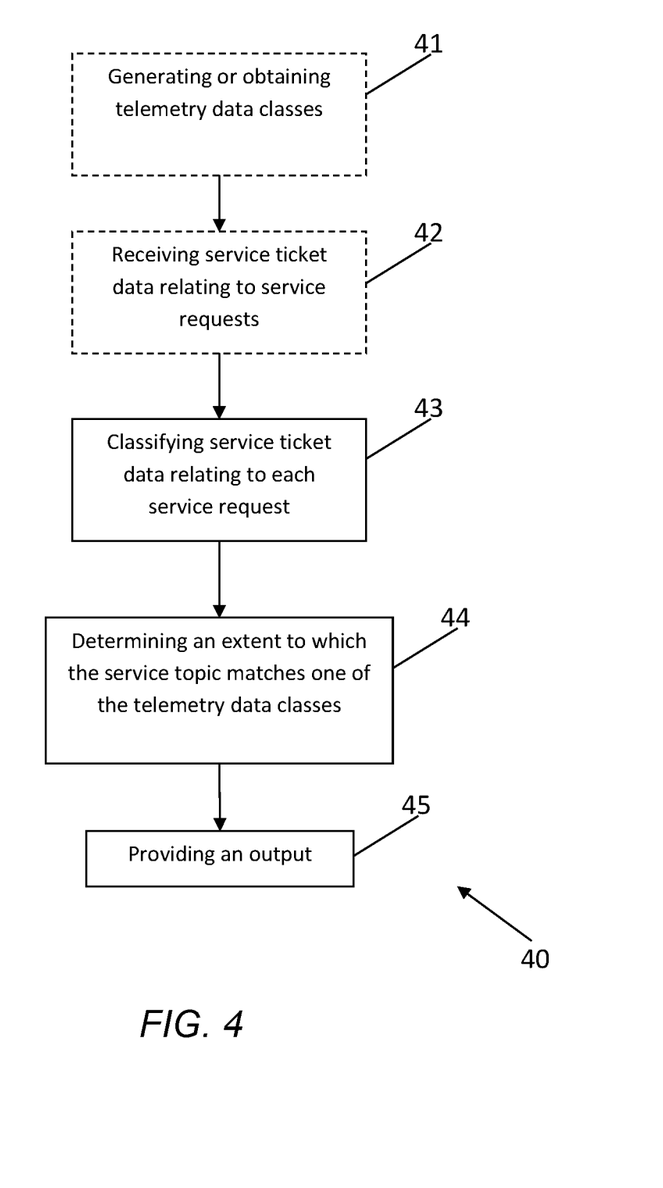
FIGS. 4 and 5 are flowcharts in accordance with examples.

FIG. 4 is a flowchart, indicated generally by the reference numeral 40, in accordance with an example. FIG. 4 may be viewed in conjunction with FIGS. 1 to 3 for better understanding of the examples.

At operation 41, a telemetry data class may be obtained, such that the telemetry data classes are provided as inputs to the output module 22. Alternatively, or in addition, the telemetry data class may be generated by the telemetry data classification module 31 of the system 30. In an example, a plurality of telemetry data classes may be obtained or generated.

At operation 42, service ticket data relating to a service request may be received, such that the service ticket data may be provided as an input to the first classification module 21. For example, when issues regarding the device are reported, a service request may be created for each issue or for a plurality of issues (e.g. related issues that may be grouped into one service request). The service ticket data may comprise information regarding the service requests.

At operation 43, the service ticket data relating to the service request may be classified into a service topic at the first classification module 21. For example, the service topic may comprise information regarding issues identified in the service request, contextual information (e.g. the context in which the issues occurred), and/or metadata (e.g. time stamps, geographical information, environmental information, organization enrichment information, etc.). In an example, the classification may be performed using natural language processing. As described above, organizations may track issues (such as information technology (IT) issues) using ticketing systems, which systems may allow reporting, prioritization, scheduling, assigning, and tracking issues. For example, the ticketing system may allow users to enter service requests, such that an administrator may be informed about the issue. The contents of the service request may comprise text, for example, composed by the user entering the service request. It may be possible that different users may describe the same problem differently in words. As such, at operation 43, the service topic may be determined for the service ticket data by processing the text in the service request. For example, natural language processing may be used for determining service topics that the service request may belong to. For example, a first service request may comprise a text "printer cannot connect to a network", and a second service request may comprise a text "printer cannot be used wirelessly". Even though the first service request and the second service request are worded differently from each other, the first service request and the second service request may be related to the same issue. Therefore, the first classification module 21 may use natural language processing for classifying the first service request and the second service request into the same service topic.

At operation 44, the output module 22 may determine, for each service request, an extent to which the service topic matches a telemetry data class. For example, for each service request, an individual may attempt to fix issues identified in the service request by performing an activity at the device. The activity performed may be logged as telemetry data. As described above, the telemetry data may be classified into telemetry data classes. For example, a service topic may match the telemetry data class to a high extent if the activity indicated by the telemetry data class match with an expected activity that is performed in response to the service request. For example, if a service topic is related to printer ink not being applied on a substrate with the right colour or concentration, the expected activity may comprise replacing an ink cartridge, changing settings related to the ink cartridge, checking whether the ink cartridge is fitted properly, or the like. If the telemetry data class indicates that the activity was related to settings that are unrelated to the ink cartridge (e.g. changing network settings, security settings, passwords, etc.), the extent to which the service topic matches the telemetry data class may be low. The activity indicated by the telemetry data classes may comprise an activity performed within a threshold time period after the service request is entered. Alternatively, the telemetry data classes may indicate an activity that was performed at a time period where there were no unresolved service requests, such that it may be determined that the extent to which any of a plurality of service topics match any of the telemetry data classes may be low.

At operation 45, the output module 22 provides an output based on the determination at operation 44. For example, the output may provide an indication of the extent to which the service topic matches the telemetry data classes. For example, if an activity comprises changing security settings or passwords of a device, and there are no service topics that may require such activities to be performed, the output may provide an alert to a user that a suspicious or malicious activity may have been performed at the device. (It should be noted that such identified activities may not necessarily be malicious. For example, such changes could be accidental, or made in error.)

In one example, the service ticket data considered at operation 42 may relate to a service request recorded within a first threshold time period before the performance of the activities of said telemetry data. For example, if an activity related to a firmware upgrade is performed within a threshold time period (e.g. one week) of a service request recorded for a firmware upgrade, the extent to which the service topic matches the telemetry data classes may be high, and it may be likely that the activity of firmware upgrade is not malicious. However, if the firmware upgrade is performed outside the first threshold time period (e.g. before the service request is entered, or one year after the service request is entered), the extent to which the service topic matches the telemetry data classes may be low, and it may be likely that the activity of firmware upgrade is suspicious or malicious (or, as noted above, could be accidental or made in error).

In an example, the service ticket data received at operation 42 comprises metadata. For example, the metadata may include information indicating device identification of the device for which a service request is entered, identity of a user who entered the service request, timestamps of the service request being entered or resolved, or the like. The telemetry data may also comprise metadata, such that the metadata may indicate timestamps of when an activity is performed, device identification of the device where the activities are performed, user identification of a user or administrator performing the activity, or the like. In an example, the determination, at operation 44, of the extent to which the service topic matches the telemetry data class may be at least partially based on the metadata. For example, the metadata may provide timestamps corresponding to the service request and the telemetry data, such that it may be determined whether the activities performed at a first time period (as indicated by the metadata of the telemetry data) are expected to be performed in response to a service request during or before the first time period. In another example, there may be an authorized individual who may be authorized to perform certain activities, such as firmware upgrades for the device. If it is determined from the metadata that the activity related to firmware upgrades is performed on devices used by unauthorized individuals, the extent to which the service request matches the telemetry data classes may be low.

In one example, at operation 41, one or more telemetry data classes may be generated or obtained for activities at one or more devices. At operation 42, the received service ticket data may relate to one or more service requests relating to at least some of said one or more devices. At operation 43, the service ticket data relating to each service request may be classified into a service topic. At operation 44, the determined extent may comprise an extent to which the service topic matches any one of the said one or more telemetry data classes.

Figure 5:
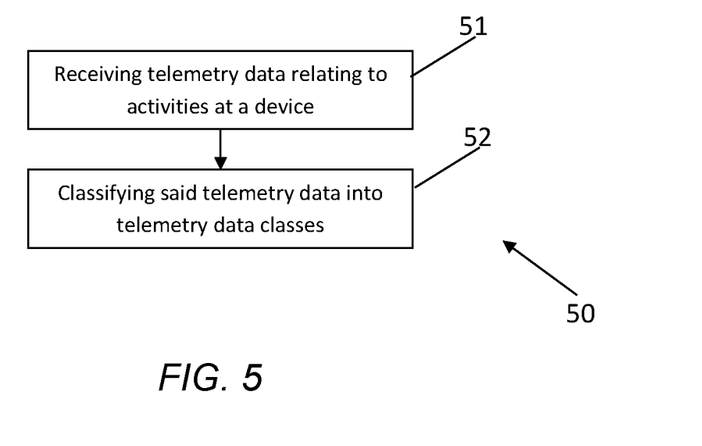

FIG. 5 is a flowchart, indicated generally by the reference numeral 50, in accordance with an example. As described above, the first module may generate or obtain a telemetry data class relating to activities at a device. For example, at operation 51, the output module 22 of the telemetry data classification module 31 may receive telemetry data relating to activities at the said device, or another device. At operation 52, the telemetry data may be classified (e.g. by the classification module 31) into a telemetry data class or a plurality of telemetry data classes. For example, when an issue is resolved in response to a service request by performing an activity, the activity may be logged as telemetry data, and a description of the activity may also be logged. For example, the description may comprise text such as "Cleared the error by applying a firmware upgrade". The telemetry data related to the service request may then be classified, for example, into a telemetry data class of "firmware upgrade".

Figure 6:
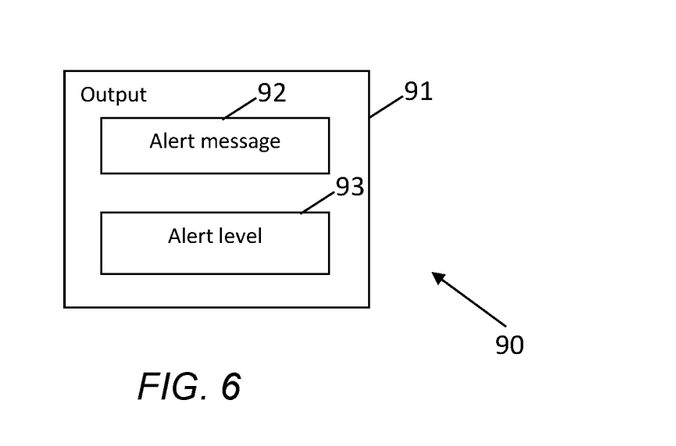
FIG. 6 is a block diagram of an output format in accordance with an example.

FIG. 6 is a block diagram of an output format, indicated generally by the reference numeral 90, in accordance with an example. The output 91 (e.g. generated at operation 45 with reference to FIG. 4, or at output module 22 with reference to FIG. 2 or 3) may comprise an alert message 92 and/or an alert level 93. In the event that a telemetry data class (e.g. an activity) does not match to a service topic, or the extent to which the telemetry data class match the service topic is low, the output may comprise an alert message 92 in order to notify an administrator that a suspicious or malicious activity may have been performed at the device. Alternatively, or in addition, the output may comprise an alert level 93. For example, if the extent to which the telemetry data class matches the service topic is high, the alert level may be low in order to indicate that there is no likelihood or low likelihood that the activity is malicious. Alternatively, if the extent to which the telemetry data class matches the service topic is low, the alert level may be high in order to indicate that there is high likelihood that the activity is suspicious or malicious.

In an example, a first score may be determined, such that the first score indicates an extent to which the telemetry data class match the service topic. The first score may be based on the matching of the telemetry data classes and service topics, based, at least partially, on natural language processing techniques and/or machine learning techniques. As such, the alert level 93 may be based on the first score. In an example, if the first score and/or the alert level 93 is/are higher than a threshold, the output comprises an alert message 92, such that the alert message 92 is sent to an administrator as a notification that a malicious activity may have been performed at the device.

In one example, if the extent to which the service topic matches the telemetry data class is below a threshold, it may be determined (e.g. indicated by a score, such as a binary score) that the service topic does not match the telemetry data class, and that an activity being performed may be suspicious or malicious. Similarly, if the extent to which the service topic matches the telemetry data class is above a threshold, it may be determined (e.g. indicated by a score, such as a binary score) that the service topic matches the telemetry data class, and that the activity being performed is not suspicious or malicious.

A first score may be generated in many ways. An example arrangement includes providing a high score where there is a mismatch between the actions and the service topic, but alternative arrangements are possible.

For example, assume that telemetry classes and service classes are equal. Natural language processing may provide a "likelihood" in the range [0,1] representing a degree of certainty that a service ticket belongs to a given class. Given n classes and service ticket S, the classifier may give a number $s\_i$, $0 \le i \le n$, $s\_i$ in [0,1]. For a given S, we may choose $N = \text{argmax}(s\_i)$ as the most likely class, and $s\_N$ as the corresponding score. Each class, i, may also have a priority score (e.g. $c\_in$ [0,1]). As an example, if i indicates a password change, then $c\_i$ may be high (close to 1), but if i indicates a printer cartridge change then $c\_i$ may be low (close to 0), such that a password change may have a higher priority than a cartridge change. The priorities may be customer dependent and/or based on risk posture, etc. Sequences of telemetry data may be classified in a similar way. For example, T may denote a sequence of telemetry items. T can also be assigned to one of the n classes and a score $t\_i$, $0 \le i \le n$ may be assigned as the likelihood that the sequence T is of class i. Here, the score can be a binary score (e.g. predetermined by experts). This means that T may be determined to be of a certain class with absolute certainty. There may be multiple T within a window. For a pair (S,T), a score (i.e. the "first score" referred to above) may be created simply as $(1-s\_N)*c\_N*t\_N$. This can then be compared against a threshold. If the condition that telemetry classes and service classes are equal is relaxed, then a similar process and result can be achieved by mapping the telemetry classes to the predefined service classes with differing scores. As an example, this may become a multiplier in the subsequent score.

In one example, when classifying the telemetry data into classes of action types, there may be a score associated with each of those classes. For example, messages that classify as being associated with clearing a paper jam or changing toner may be considered a low risk (e.g. low priority described above), whereas user administration or security setting changes may be considered high risk (e.g. high priority described above) and hence the score would be used to represent risk knowledge about the class. The scores provided may be customer specific: for example, if a customer is concerned with toner theft, this could be designated as a high risk. Alternatively, or in addition, a matrix of service topics verses telemetry data class (i.e. what the actions suggest is happening) may be provided. For example, score modifiers may be encoded if there are some known actions which are often carried out whilst fixing a particular service topic, even though they might not be relevant (perhaps due to the engineer needing to find and locate a fault or trying different options). In such a matrix, there may be a score so that when a particular service topic is defined to come from a trouble ticket, then the expected (or acceptable) telemetry groups have a low score. For the given service topic, the sum of the scores may be calculated for any telemetry classes from the devices within the given time. Here, the higher total scores indicate more significant alerts. Thus, for example, security setting changes may be downplayed (as they are expected) when network issues are reported, but not when issues are reported with user management or printer functionality (e.g. a request for more toner). In this way, a score may be modified within the context of the service topic.

As a further example, there may be a case where a trouble ticket has a reasonable level of classification over multiple service topics. A matrix may be defined for a given service topic (i) and telemetry class j), such that a matrix element $M_{i,j}$ contains the probability that when the service topic i happens, then the telemetry class j would be observed. For each telemetry topic j, we may look across all service topics (0, ..., n) and take the minimum value of $t_j*(1-(s_i*m_{ij}))$. Then, the scores may be added up for each of the telemetry classes. In effect, a score is calculated such that if there are several highly classified service topics, telemetry data which matches any of the high scores is classified into the service topic based, at least partially, on how well the service topic is classified.

Many alternative arrangements for generating the first score are possible. For example, additional weighting may be added onto certain telemetry classes that represent high risk operations.

Figure 7:
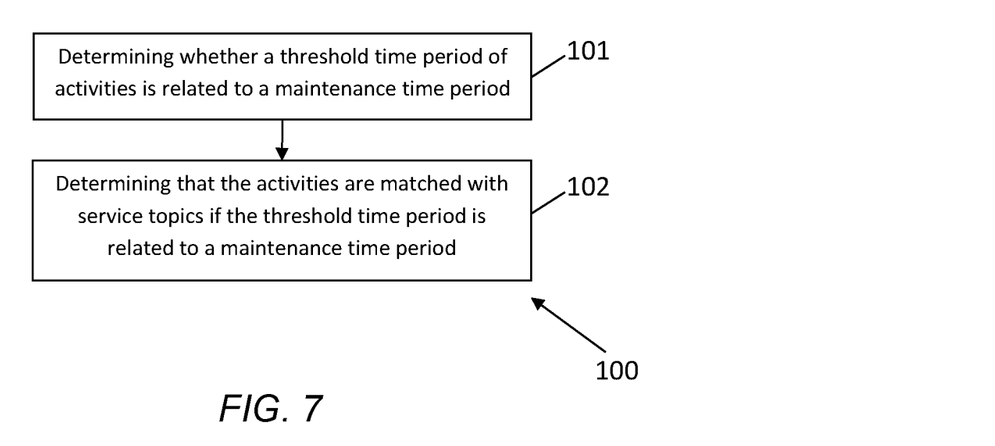
FIGS. 7 to 10 are flowcharts in accordance with examples.

FIG. 7 is a flowchart, indicated generally by the reference numeral 100, in accordance with an example. At operation 101, an output module (e.g. the output module 22) may determine whether a second threshold time period before and/or after performance of the activity is related to a maintenance time period. At operation 102, if the second threshold time period is related to the maintenance time period, it may be determined that the extent to which the service topic matches the telemetry data classes may be high, and it may be likely that the activity is not malicious. For example, during a maintenance time period, various activities may be performed even if there are no specific issues specified in any service requests. As such, the activities may be related to the maintenance of the device, and may not be maliciously performed.

Figure 8:
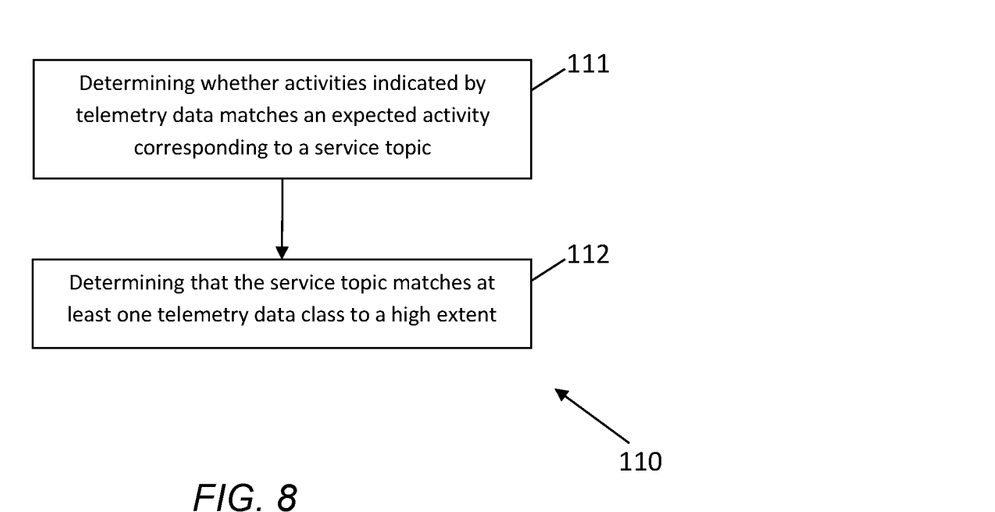

FIG. 8 is a flowchart, indicated generally by the reference numeral 110, in accordance with an example. At operation 111, it is determined whether the activity indicated by telemetry data matches an expected activity corresponding to a service topic. At operation 112, if the activity matches an expected activity, it may be determined that the extent to which the service topic matches the telemetry data classes may be high. For example, an expected activity corresponding to a service topic related to ink cartridge may be an activity related to the ink cartridge. As such, if an ink cartridge replacement activity is performed in response to the service topic related to an ink cartridge, it may be determined that the extent to which the service topic matches the telemetry data classes may be high.

Figure 9:
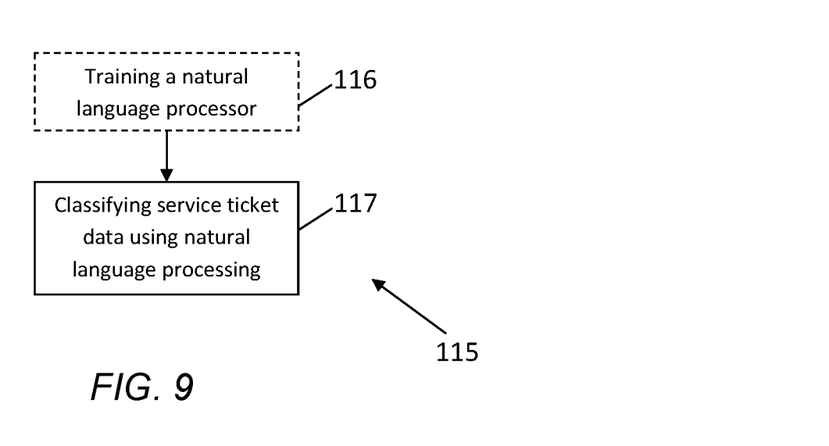

FIG. 9 is a flowchart, indicated generally by the reference numeral 115, in accordance to an example. At operation 116, a natural language processor may be trained, for example, based on the received service ticket data, as described with reference to FIGS. 2 to 3. In one example, the service ticket data used for training the natural language processor may comprise training service ticket data. At operation 117, the service ticket data may be classified into a service topic using the trained natural language processor. For example, the service ticket data may be used for training the natural language processor. However, the trained natural language processor may thereafter be used for classifying the service ticket data at operation 117. As such, when service ticket data is received, the service ticket data the operation 116 of training the natural language processor may or may not be performed before performing the classification at operation 117.

Figure 10:
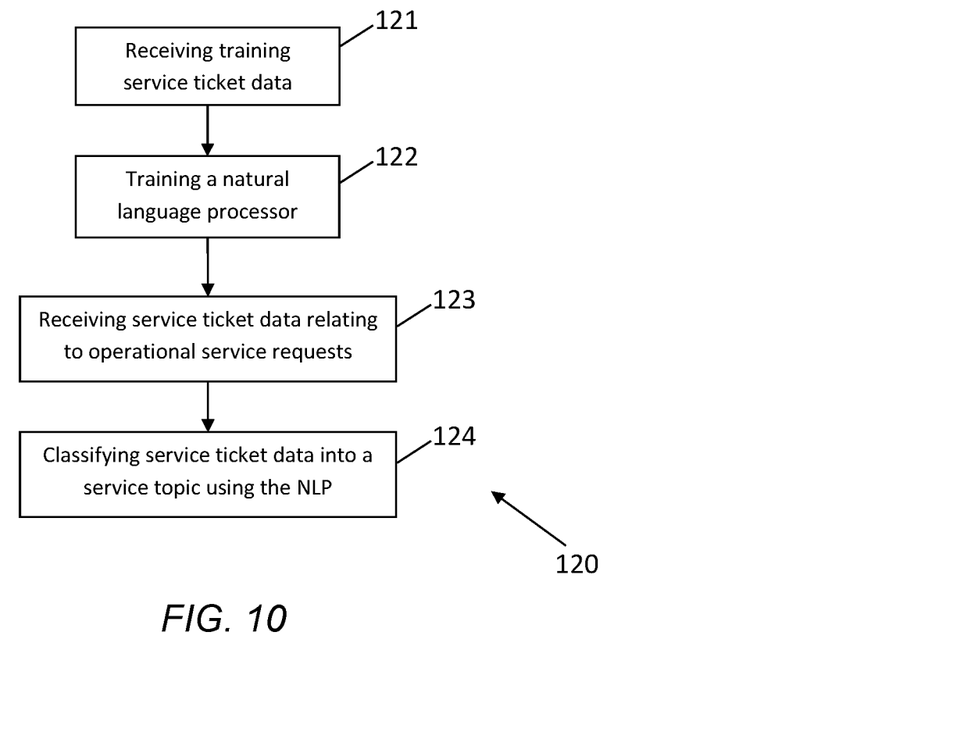

FIG. 10 is a flowchart, indicated by the reference numeral 120, in accordance with an example. At operation 121, training service ticket data may be received, where the training service ticket data may be related to example service requests relating to a device (or a plurality of devices). At operation 122, a natural language processor may be trained using the said training service ticket data and associated service topics. At operation 123, service ticket data relating to an operational service request may be received. The operational service request may relate to said device corresponding to the training service ticket data. At operation 124, service ticket data (e.g. new service ticket data) relating to the operational service requests may be classified into a service topic using said natural language processor. As such, the natural language processor may be pre-trained (e.g. static training) with training service ticket data related to example service requests. The natural language processor may further be trained with service ticket data relating to the operational service request (e.g. dynamic updating of training data, and dynamic training of the natural language processor). The training of the natural language processor is described in further detail below with reference to FIG. 11. The operations 121 and 122 may be repeated a number of times before the operations 123 and 124 are executed. Moreover, a number of instances of the operations 121 and 122 may be implemented after a number of instances of the operation 123 and 124 are executed (i.e. the training of the relevant natural language processor may be updated).

Figure 11:
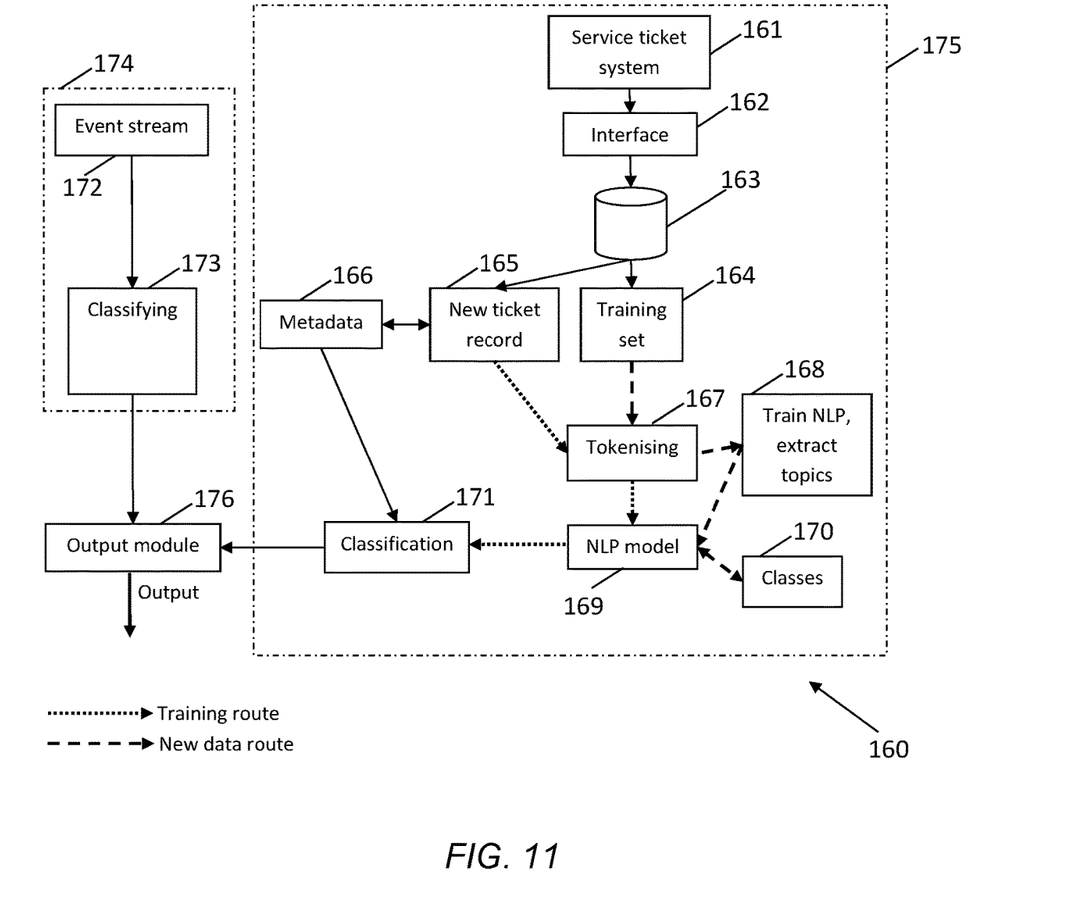
FIG. 11 is a block diagram of a system in accordance with an example.

FIG. 11 is a block diagram of a system, indicated generally by the reference numeral 160, in accordance with an example. The system 160 comprises a telemetry data module 174, a service ticket module 175 and an output module 176. The system 160 is an example implementation of the first module 12 and the systems 20 and 30 described above with reference to FIGS. 1 to 3. For example, with reference to FIG. 3, the first classification module 21 may be similar to a classification module 171 comprised in the service ticket module 175, the telemetry data classification module 31 may be similar to the classification module 173 comprised within the telemetry data module 174, and the output module 22 may be similar to the output module 176.

The elements of the system 160 are described in detail below. It will be apparent to those skilled in the art that a number of variants of the system 160 are possible. For example, a number of the modules may be omitted, combined or varied.

The service ticket module 175 may comprise a service ticket system 161, an interface 162, a service ticket database 163, a training set 164, a new ticket record 165, metadata 166, tokenizing module 167, training module 168, natural language processing model 169, service ticket classes 170, and classification module 171. In an example, the service ticket system 161 is used for receiving service requests (e.g. implementing operation 42 with reference to FIG. 4) related to a device from a user, such that service ticket data may be analysed. The service ticket system 161 may comprise a third party ticketing system, and the service ticket data may be received at the database 163 using an application programming interface, such as the interface 162. The service ticket data may be recorded in the new ticket record 165, and may also be used as a part of a training set 164 for training a natural language processing model, such as a machine learning model (e.g. implementing operation 116 and/or 122 with reference to FIGS. 9 and/or 10 respectively).

For example, in a training route (indicated by the dashed arrows), the service ticket data may be used as training data. The tokenizing module 167 may parse the service ticket data, and may assist in tagging part(s) of the service requests. For example, the tagging may comprise speech tagging (e.g. to find nouns, etc.), and name entity recognition that may identify certain types of words, such as locations. The training module 168 may use the service ticket data and/or the parsed service ticket data for training the machine learning model (e.g. the NLP model 169). For example, the training module 168 may extract topics for the service requests based on natural language processing techniques. The topics may be related to the type of service request, the location of the devices related to the service request, the type of activities required to resolve issues specified in the service request, or the like. The service ticket data may then be classified (e.g. implementing operation 43, 117, and/or 124, with reference to FIGS. 4, 9, and/or 10 respectively) into classes 170, where the classes 170 may comprise service topics.

The classification indicated by the classes 170 may be used at the NLP model 169 for classifying service ticket data related to new ticket records 165. For example, in a new data route (indicated by the dotted arrows), when new service requests are entered, new service ticket data related to the new service requests may be recorded at the new ticket record 165. The tokenizing module 167 may parse the new service ticket data and may assist in tagging part(s) of the new service requests (e.g. speech tagging and/or name entity recognition). The new ticket record may also record metadata 166 from the new service requests. The NLP model 169 may be used for determining topics related to the new service ticket data, for example, based on natural language processing techniques. The classification module 171 may be used for classifying the service requests into a service topic (e.g. implementing operation 43, 117, or 124, with reference to FIGS. 4, 9, and 10 respectively).

The telemetry data module 174 may comprise an event stream 172 and a classification module 173. The event stream 172 may be generated as a continuous time series that may comprise information regarding activities performed at a device. For example, the telemetry data (similar to telemetry data 11 described above with reference to FIG. 1) may be logged via protocols such as syslog and other event types. Such telemetry data related to activities or events may be designed to be provided to event management engines for further processing and analysis. The classification module 173 may aggregate, analyze, and classify the telemetry data received in the event stream (e.g. implementing operation 52 described above with reference to FIG. 5). For example, a single activity may correspond to a plurality of data points in the telemetry data, and the plurality of data points may be aggregated to identify the single activity corresponding to the plurality of data points. For example, a firmware upgrade may comprise various operations such as logging in, uploading a firmware file, entering 1o authentication codes, entering preferences, agreeing to terms and conditions, confirming the upgrade, and the like. These operations may be aggregated and classified into a telemetry data class named "firmware upgrade".

At the output module 176, the telemetry data classes received from the telemetry data module 174 may be compared against service topics received from the service ticket module 175. The comparison may be based on the nature of the activities indicated by the telemetry data classes, the nature of the service topics, and/or the metadata related to the telemetry data and/or service tickets. For example, the activities from the event stream may be compared with the service topics in order to determine whether the activities (e.g. administrative actions) were aligned with service requests (e.g. trouble tickets). The metadata (such as timestamps) related to the telemetry data and service requests may be used to determine whether activities occurred within threshold time periods of service requests being entered. Alternatively, or in addition, metadata (such as device identification) related to the telemetry data and service requests may be used to determine whether the activities performed and the service requests relate to the same device or different devices, or whether the activities performed at a device correlates with service requests related to devices in the same office or different offices. Metadata comprising login data may also be used to identify the administrator of the device at which activities are performed, and may be compared to the metadata in the service request indicating whether the same administrator is working to resolve the issue specified in the service request. As such the telemetry data and the service ticket data may be compared in order to identify correlations or inconsistencies in activities performed at the device. The output module 176 may provide an output based on an extent to which service topics match telemetry data classes (e.g. implementing operation 45 with reference to FIG. 4). For example, if an activity cannot be accounted for through the presence of a relevant service request, the output may comprise an alert level or alert message indicating a high risk associated with the activity. The alert level or message may be provided to an administrator, such that the activities may be investigated. For example, if an activity relates to a configuration or security settings being changed without any reason or when a configuration change is not required, the output (e.g. alert message or alert level) may indicate that such activities may be suspicious or malicious, and that the activities should be investigated.

In an example, the telemetry data classes and/or service topics determined by the classification modules 173 and 171 respectively may be updated manually by an administrator. For example, when activities are investigated by an administrator, the administrator may investigate whether the classification of the telemetry data into telemetry data classes or the classification of the service ticket data to service topics are inaccurate. Such inaccurate classification may create false alarms, and may be corrected by the administrator. Such inaccuracies may also be logged as examples, and may be used for further training the NLP model to provide better classifications. The administrator may also create new telemetry data classes or service topics, and classify activities or service ticket data accordingly. This provides an extended database for refining and retraining the NLP or telemetry data or service topic classification. Alternatively, or in addition, the classification module 171 may be updated by further training and/or updating the NLP model 169, and the classification module 173 may be updated by training and/or updating a model (e.g. a machine learning model) used for classifying telemetry data into telemetry data classes).

Figure 12:
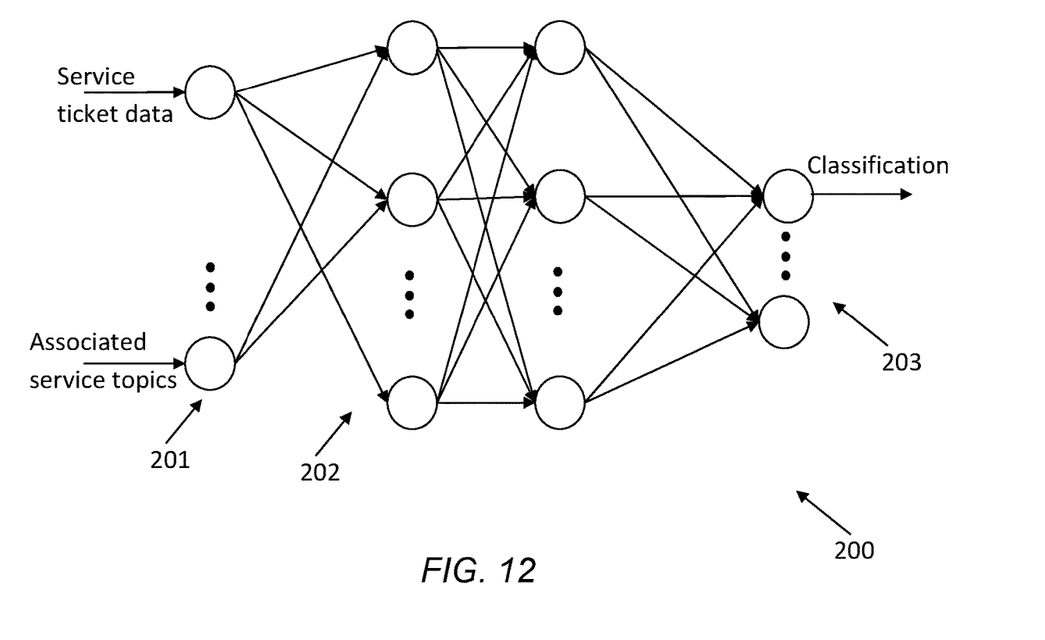
FIG. 12 is a block diagram of a neural network in accordance with an example.

In an example, the natural language processor may comprise a machine learning model. FIG. 12 shows a neural network, indicated generally by the reference numeral 200, used in some examples. For example, the natural language processor may comprise a machine learning model, such as the neural network 200. The neural network 200 may be trained with inputs, including service ticket data (e.g. relating to example service requests and/or operational service requests). The neural network 200 comprises an input layer 201, a hidden layer 202 (or a plurality of hidden layers 202), and an output layer 203. At the input layer 201, service ticket data related to a plurality of service requests may be received as inputs, along with associated service topics that the service ticket data may be classified into. The hidden layers 202 may comprise a plurality of hidden nodes, where the processing may be performed based on the data received. At the output layer 203, classification of the service ticket data into service topics may be determined.

As described above, service topics may be generated and matched with the appropriate corresponding classes of telemetry data, for example for a given printer within the time window of a service ticket. A set of associated events may therefore be collected together (e.g. service ticket, telemetry events, telemetry classes, service topics, matching score) which can then be stored as an audit record (which may be referred to as an "evidential unit"). The storing of such an audit record may allow the performance of a retrospective analysis on the data to associate the events linked to a trouble ticket and how they were interpreted.

The examples described may be implemented in software, hardware, application logic or a combination of software, hardware and application logic. The software, application logic and/or hardware may reside on memory, or any computer media. In an example, the application logic, software or an instruction set is maintained on any one of various computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

If desired, the different functions discussed herein may be performed in a different order and/or concurrently with each other. Furthermore, if desired, at least some of the above-described functions may be optional or may be combined.

It will be appreciated that the above described examples are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
classifying service ticket data relating to a service request into a service topic, wherein the service ticket data is obtained from the service request relating to a device;
determining, for the service request, an extent to which the service topic matches a telemetry data class, wherein the telemetry data class indicates a classification of activities generated at the device; and
providing an output according to said determination.

2. The method as claimed in claim 1, further comprising:
receiving telemetry data relating to the activities generated at the devices; and
classifying said telemetry data into the telemetry data class.

3. A method as claimed in claim 1, wherein classifying said service ticket data is performed using natural language processing.

4. A method as claimed in claim 3, further comprising training a natural language processor for performing said natural language processing.

5. A method as claimed in claim 1, further comprising determining a first score, wherein the first score indicates the extent to which the service topic matches the telemetry data class.

6. A method as claimed in claim 1, wherein said service ticket data includes metadata.

7. A method as claimed in claim 6, wherein determining whether the service topic matches the telemetry data class is at least partially based on said metadata.

8. A method as claimed in claim 1, wherein said output comprises an alert message in the event that the extent to which the service topic matches the telemetry data class is lower than a threshold.

9. A method as claimed in claim 1, wherein said output comprises an alert level.

10. The method as claimed in claim 1, wherein the service ticket data relates to the service request, such that the service request is recorded within a first threshold time period before performance of the activities of said telemetry data.

11. The method as claimed in claim 1, further comprising:
determining whether a second threshold time period before and/or after performance of said activities is related to a maintenance time period; and
determining that the activities are matched with the service topic if the second threshold time period is related to the maintenance time period.

12. The method as claimed in claim 1, wherein determining whether the service topic matches the telemetry data class comprises determining whether said activities match an expected activity corresponding to the service topic.

13. An apparatus comprising:
a first classification module for classifying service ticket data relating to a service request into a service topic, wherein the service ticket data is obtained from the service request relating to a device; and
an output module for determining, for each service request, whether the service topic matches a telemetry data class and providing an output accordingly, wherein the telemetry data class indicates a classification of activities generated at the device.

14. A non-transitory machine-readable storage medium encoded with instructions executable by a processor, the machine-readable storage medium comprising instructions to:
classify service ticket data relating to a service request into a service topic, wherein the service ticket data is obtained from the service request relating to a device;
determine, for the service request, an extent to which the service topic matches of a telemetry data class, wherein the telemetry data class indicates a classification of activities generated at the device; and
provide an output according to said determination.

* * * * *